T. O. THURSTON.
CORN HARVESTER.
APPLICATION FILED AUG. 17, 1909.
961,660.
Patented June 14, 1910.
2 SHEETS—SHEET 1.
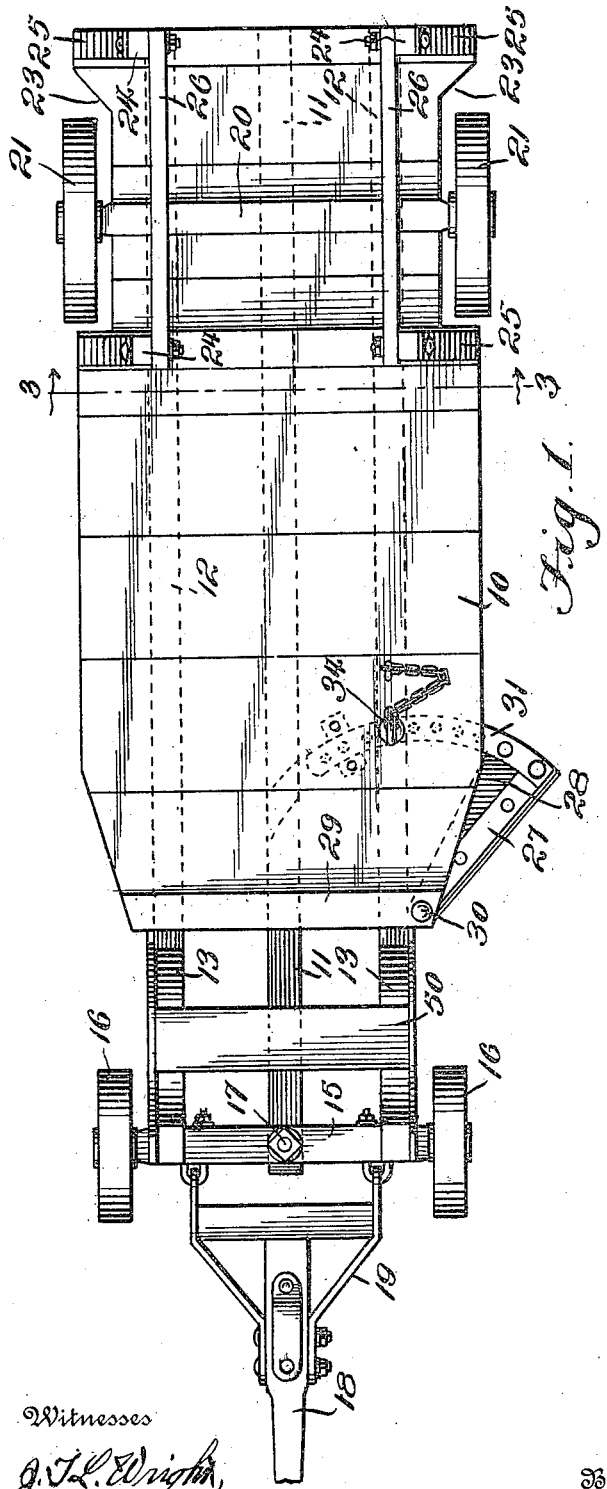
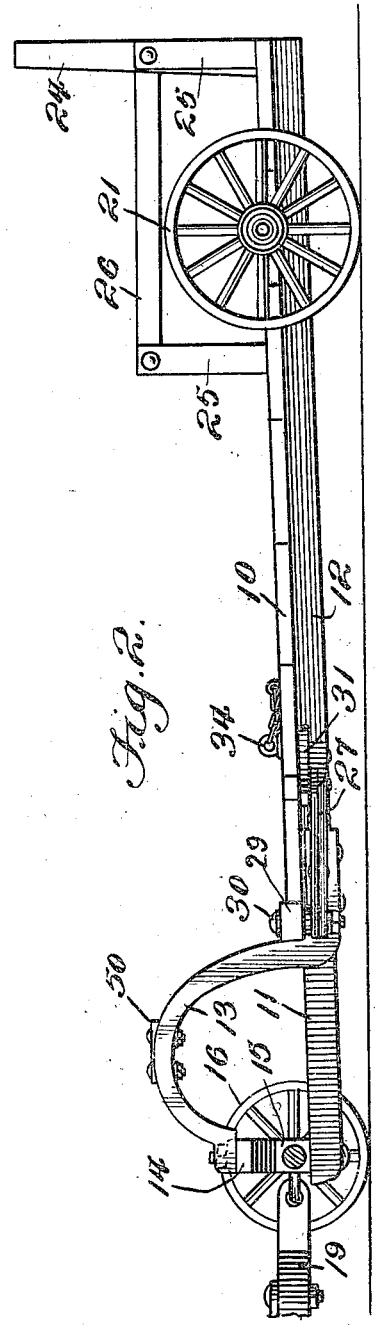
Witnesses
J. L. Wright
Wm Bagger
Inventor
Thomas O. Thurston
By Victor J. Evans,
Attorney

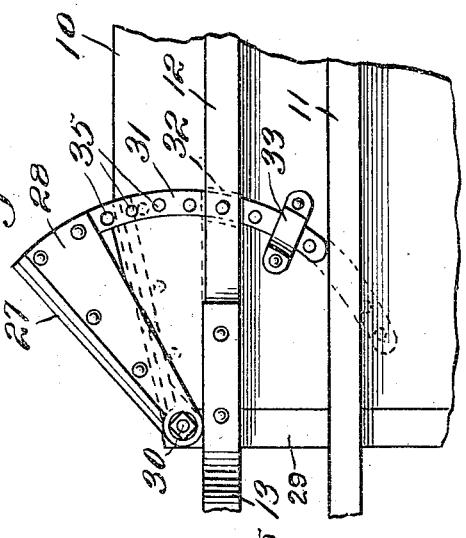
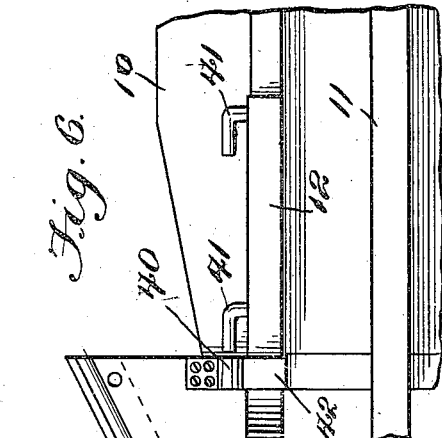
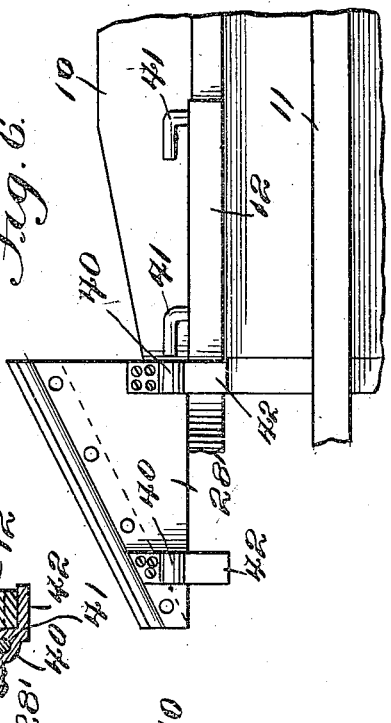
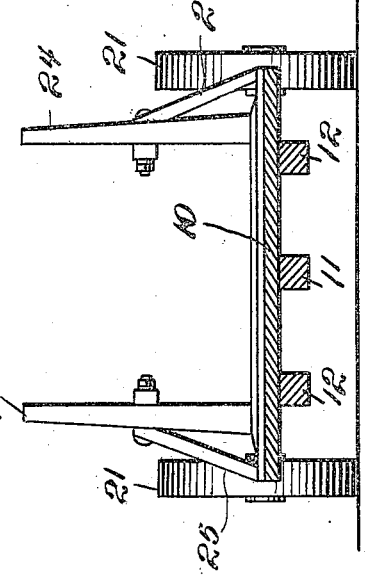
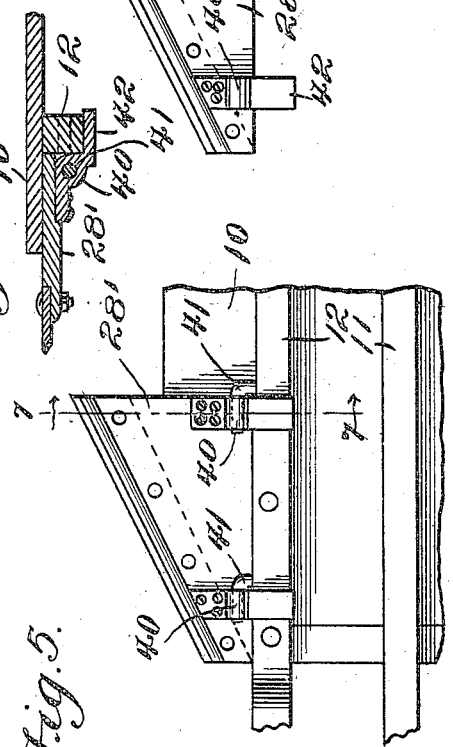

UNITED STATES PATENT OFFICE.

THOMAS O. THURSTON, OF MANCHESTER, VIRGINIA, ASSIGNOR OF ONE-HALF TO E. C. BELLWOOD, OF MANCHESTER, VIRGINIA.

CORN-HARVESTER.

961,660.

Specification of Letters Patent.   Patented June 14, 1910.

Application filed August 17, 1909.   Serial No. 513,209.

*To all whom it may concern:*

Be it known that I, THOMAS O. THURSTON, a citizen of the United States, residing at Manchester, in the county of Chesterfield and State of Virginia, have invented new and useful Improvements in Corn-Harvesters, of which the following is a specification.

This invention relates to that class of corn harvesters which include a suitably supported platform adapted to be propelled over the field and equipped with stalk engaging cutters arranged slantwise for engagement with the corn stalks which are thereby severed; the severed stalks being gathered by an operator stationed upon the platform, and piled upon the latter until a suitable load has been accumulated which can then be conveyed to a barn or other place of storage such as a silo in which corn for fodder may be deposited after being subjected to the action of an ensilage cutter.

The present invention has for its objects to produce a corn harvester of the character described which shall possess superior advantages in point of simplicity, durability and general efficiency; and with these and other ends in view which will readily appear as the nature of the invention is better understood the same consists in the improved construction and novel arrangement and combination of parts which will be hereinafter fully described and particularly pointed out in the claim.

In the accompanying drawings has been illustrated a simple and preferred form of the invention; it being however, understood that no limitation is necessarily made to the precise structural details therein exhibited, but that changes, alterations and modifications within the scope of the invention may be resorted to when desired.

In the drawings: Figure 1 is a top plan view of a corn harvester constructed in accordance with the invention. Fig. 2 is a side elevation of the same. Fig. 3 is a vertical transverse sectional view taken on the plane indicated by the line 3—3 in Fig. 1. Fig. 4 is a detail plan view of the underside of the forward portion of the platform showing the manner of connecting the knife or cutter therewith. Fig. 5 is a detail view showing the underside of the front portion of the platform and showing a modified method of connecting the cutter therewith. Fig. 6 is a similar view showing the cutter detached. Fig. 7 is a sectional detail view taken on the plane indicated by the line 7—7 in Fig. 5.

Corresponding parts in the several figures are denoted by like characters of reference.

The platform 10 of the improved harvester is supported preferably upon three longitudinal beams or bars 11 and 12—12 the middle one of which 11 is extended forwardly of the platform, as clearly shown in Figs. 1 and 2. Arched beams 13 connected with the forward ends of the longitudinal bars 12 beneath the front end of the platform are connected at their forward extremities with a bolster 14 supported upon an axle 15 at the ends of which low transporting wheels 16 are mounted for rotation. The king bolt 17 which connects the bolster 14 with the axle 15 also extends through the forward end of the bar or beam 11, thus supporting the forward end of the platform at a low elevation above the ground. The draft means such as a tongue 18 is to be connected with the axle in any suitable and convenient manner which, as shown in the drawings, may include the hounds 19. The rear axle 20 having the transporting wheels 21 extends transversely across the rear portion of the platform, the supporting beams of which 11 and 12 may be bolted upon or otherwise connected with the underside of the axle. In order to avoid the use of an axle of excessive length, it is preferred to provide the sides of the platform with recesses 23 to accommodate the supporting wheels 21 which may thus travel between the rows of stalks. The front axle may be quite short, and the wheels 16 of said axle will, in turning, be accommodated below the arched beams 13.

Supported upon the platform 10 adjacent to the sides thereof and near the rear end, are pairs of uprights 24 that are reinformed and suspend in upright positions by means of braces 25; said uprights being connected in pairs by longitudinal side rails 26 which coöperate with said uprights to form a cradle or receptacle wherein the severed corn stalks may be deposited.

Cutting apparatus may be connected with one or with both sides of the platform, adjacent to the front end of the latter, but in the drawings it has been shown adjacent to one side only; it being understood that cutting apparatus may be applied to both sides if preferred. The cutting apparatus illustrated in Figs. 1 and 7 comprises a knife or cutter bar 27 securely mounted upon a base or reinforcing member 28, and pivotally connected with a cross bar 29 which constitutes the extreme front end of the platform by means of a pin or bolt 30. Securely connected with the rear end of the knife as well as with the rear end of the base 28 is an arcuate arm 31 that is concentric with the pivot 30 and which is guided through a slot or notch 32 in the proximate supporting beam 12, and through a keeper 33 upon the underside of the platform. A pin 34 extending vertically through the platform is capable of engaging any one of a plurality of perforations 35 in the arcuate bar 31, thus serving to secure the said arm and the knife or cutter in any one of the various positions to which it may be adjusted with one of the apertures 35 in registry with the pin 34. The knife or cutter may thus be adjusted and securely held at various angles with reference to the platform, and the said knife may, when not in use, be withdrawn beneath the platform so that no portion of the cutting edge will protrude beyond the edge of the platform which will thus constitute a guard for the knife and prevent accidental injury to persons or cattle approaching the device.

Instead of mounting the cutter upon a vertical pivot, as previously described, the construction illustrated in Figs. 5, 6 and 7 may be adopted. Under this construction, the knife supporting base which is here designated 28' and which is of approximately triangular shape is provided upon its underside with hinge lugs 40 adapted to engage pintles 41 connected with the proximate bar 12 and having flanges 42 that extend laterally beneath said bar 12, thereby supporting the cutter in an approximately horizontal position. The cutter, when thus mounted and supported, may be very readily disconnected from the platform and stored away in a safe place when not in actual use.

The operation and advantages of this invention will be readily understood from the foregoing description taken in connection with the drawings hereto annexed by those skilled in the art to which it appertains. When the machine advances over the field, adjacent to a row of corn, the stalks will be severed close to the ground by the slantingly disposed knife or cutter; the stalks which are thus cut are gathered by the operator who is stationed upon the platform and who will pile the stalks in the receptacle formed by the pairs of uprights 24, and after said receptacle has been filled, transversely upon the platform in front of the receptacle; when a sufficient load has been accumulated it may be conveyed to the place of storage and there unloaded. A seat 50 for the driver may be supported in a convenient position upon the arches 13.

Having thus described the invention, what is claimed is—

In a corn harvester of the character described, a platform, longitudinal supporting beams for said platform, pintles connected with one of the beams, and a cutting apparatus including a base and a knife supported thereon, said base being provided with hinge lugs engaging the pintles and having flanges that extend beneath the beam with which the pintles are connected.

In testimony whereof I affix my signature in presence of two witnesses.

THOMAS O. THURSTON.

Witnesses:
B. F. HAMILTON,
E. C. BELLWOOD.